(12) United States Patent
Yamate et al.

(10) Patent No.: US 6,452,347 B1
(45) Date of Patent: Sep. 17, 2002

(54) METHOD AND APPARATUS FOR DEFLECTION

(75) Inventors: Kazunori Yamate, Ibaraki; Masanobu Tanaka, Hirakata; Masanori Nakatsuji, Ibaraki; Masaaki Kobayashi, Yokohama; Akira Ueda, Kyoto, all of (JP)

(73) Assignee: Matsushita Electric Industrial Co., Ltd., Kodama (JP)

( * ) Notice: Subject to any disclaimer, the term of this patent is extended or adjusted under 35 U.S.C. 154(b) by 0 days.

(21) Appl. No.: 09/786,859

(22) PCT Filed: Jul. 12, 2000

(86) PCT No.: PCT/JP00/04655

§ 371 (c)(1),
(2), (4) Date: Mar. 12, 2001

(87) PCT Pub. No.: WO01/06758

PCT Pub. Date: Jan. 25, 2001

(30) Foreign Application Priority Data

Jul. 14, 1999 (JP) .......................................... 11-200264

(51) Int. Cl.[7] ................................................ G09G 1/04
(52) U.S. Cl. ........................ 315/371; 315/387; 315/408
(58) Field of Search ................................. 315/371, 364, 315/370, 397, 399, 387, 382.1, 389, 403, 405, 408; G09G 1/04

(56) References Cited

U.S. PATENT DOCUMENTS

| | | | | |
|---|---|---|---|---|
| 4,918,359 A | * | 4/1990 | Ogino et al. ................. | 315/397 |
| 4,988,927 A | | 1/1991 | Spruck ....................... | 315/371 |
| 4,992,707 A | * | 2/1991 | Arai et al. ................... | 315/403 |
| 6,025,680 A | * | 2/2000 | Kitou et al. ................. | 315/371 |
| 6,268,706 B1 | * | 7/2001 | Truskalo et al. ............. | 315/371 |
| 6,329,768 B1 | * | 12/2001 | Giard ......................... | 315/370 |

FOREIGN PATENT DOCUMENTS

| | | |
|---|---|---|
| EP | 0359092 A2 | 9/1989 |
| EP | 0484260 A2 | 9/1991 |
| EP | 0556695 A1 | 2/1993 |
| JP | 2-113776 | 4/1990 |
| JP | 3-145378 | 6/1991 |
| JP | 5-64024 | 3/1993 |
| JP | 5-347716 | 12/1993 |
| JP | 6-14211 | 1/1994 |
| JP | 7-15613 | 1/1995 |
| JP | 8-172543 | 7/1996 |

* cited by examiner

Primary Examiner—Don Wong
Assistant Examiner—Trinh Vo Dinh
(74) Attorney, Agent, or Firm—Armstrong, Westerman & Hattori, LLP

(57) ABSTRACT

A primary winding of a transformer is serially connected to a horizontal deflection coil. An amplitude regulating circuit outputs a first correction voltage in response to a voltage generated on a secondary winding of the transformer. A phase regulating circuit regulates the phase of the first correction voltage output from the amplitude regulating circuit and outputs a second correction voltage. An addition circuit adds the second correction voltage to a sawtooth wave voltage generated by a sawtooth wave voltage generation circuit. A correction current output from an amplifier in response to the second correction voltage output from the phase regulating circuit cancels a current component generated on a vertical deflection coil by a horizontal deflection current.

16 Claims, 5 Drawing Sheets

METHOD AND APPARATUS FOR DEFLECTION

TECHNICAL FIELD

The present invention relates to a deflection system and a deflection method of a horizontal reciprocating deflection mode scanning an electron beam in a reciprocating manner.

BACKGROUND TECHNIQUE

A deflection system of a horizontal reciprocating deflection mode scanning an electron beam in a reciprocating manner is recently proposed in the field of a display unit for a television set or the like, in order to make display of a high resolution. In the deflection system of the horizontal reciprocating deflection mode, a forward scanning line and a backward scanning line must be parallelized with each other.

FIGS. 4(a) to 4(d) are waveform diagrams for illustrating a vertical deflection current and a horizontal deflection current employed in the horizontal reciprocating deflection mode for parallelizing forward and backward scanning lines with each other. FIG. 4(a) shows a first sawtooth wave current SI1 for generating a vertical deflection magnetic field moving an electron beam from the top to the bottom of a screen of a television set or the like and thereafter returning the electron beam to the top of the screen again. When performing reciprocating scanning with the first sawtooth wave current SI1 shown in FIG. 4(a), the forward and backward scanning lines are not parallelized with each other. Therefore, inclination of a vertical deflection current must be nulled in forward scanning and backward scanning in order to parallelize the forward and backward scanning lines with each other.

Therefore, a second sawtooth wave current SI2 shown in FIG. 4(b) is added to the first sawtooth wave current SI1 shown in FIG. 4(a), for generating a vertical deflection current VI shown in FIG. 4(c). The second sawtooth wave current SI2 shown in FIG. 4(b) has the same frequency as a horizontal scanning frequency, and the inclination of the second sawtooth wave current SI2 in forward scanning and backward scanning is so set that inclination of the composited vertical deflection current VI in forward scanning and backward scanning is nulled.

A horizontal deflection current HI shown in FIG. 4(d) has the waveform of a frequency half the horizontal scanning frequency for performing reciprocating scanning.

FIGS. 5(a) and 5(b) are conceptual diagrams showing parallelized reciprocating deflection scanning. When performing reciprocating scanning with the vertical deflection current VI shown in FIG. 4(c) and the horizontal deflection current HI shown in FIG. 4(d), such ideal reciprocating scanning that a scanning line 21 performs reciprocating scanning in parallel on a screen 20 is implemented as shown in FIG. 5(a). When supplying the vertical deflection current VI shown in FIG. 4(c) to a vertical deflection coil while supplying the horizontal deflection current HI shown in FIG. 4(d) to a horizontal deflection coil, however, the scanning line maybe distorted. When a current component resulting from the horizontal deflection current HI is induced from the horizontal deflection coil to the vertical deflection coil and superposed on the vertical deflection current VI shown in FIG. 4(c), a scanning line 22 is distorted as shown in FIG. 5(b), to distort a displayed image.

In a conventional deflection system, the following method, for example, is carried out in order to cancel a current component induced to flow in a vertical deflection coil from a horizontal deflection coil by a horizontal deflection current: A transformer is serially connected to the vertical deflection coil for supplying the vertical deflection coil with a current 180° out of phase with the horizontal deflection current flowing in the horizontal deflection coil through the transformer. Thus, the current component induced to the vertical deflection coil is canceled. In this case, the transformer serially connected to the vertical deflection coil must be of a standard suitable to the large vertical deflection current, and hence the manufacturing cost is increased. Further, power consumed in a driving circuit for driving the transformer is disadvantageously increased.

An object of the present invention is to provide a deflection system and a deflection method capable of performing reciprocating deflection without distorting a scanning line and reducing the cost as well as power consumption.

DISCLOSURE OF THE INVENTION

A deflection system according to an aspect of the present invention, performing reciprocating scanning by horizontally deflecting an electron beam in a reciprocating manner in response to a vertical synchronizing signal and a horizontal synchronizing signal, comprises a vertical deflection coil, a horizontal deflection coil, a horizontal deflection current supply circuit supplying a horizontal deflection current for horizontally deflecting the electron beam in a reciprocating manner, an induced current detection circuit detecting a current component induced to the vertical deflection coil by the horizontal deflection current flowing in the horizontal deflection coil, a sawtooth wave voltage generation circuit generating a sawtooth wave voltage synchronous with the vertical synchronizing signal, a first current supply circuit receiving the sawtooth wave voltage generated by the sawtooth wave voltage generation circuit and supplying a first sawtooth wave current for vertically deflecting the electron beam to the vertical deflection coil, a second current supply circuit supplying a second sawtooth wave current for parallelizing forward and backward scanning lines with each other to the vertical deflection coil, and a correction voltage addition circuit adding a correction voltage for canceling the current component detected by the induced current detection circuit to the sawtooth wave voltage generated by the sawtooth wave voltage generation circuit.

In the deflection system, the induced current detection circuit detects the current component induced to the vertical deflection coil by the horizontal deflection current flowing in the horizontal deflection coil. The correction voltage addition circuit adds the correction voltage to the sawtooth wave voltage on the basis of the detected current component, and the first current supply circuit supplies the current component responsive to the correction voltage to the vertical deflection coil.

Thus, the current component induced to the vertical deflection coil by the horizontal deflection current flowing in the horizontal deflection coil can be canceled. Therefore, reciprocating deflection can be performed without distorting the scanning lines. In this case, no transformer may be serially connected to the vertical deflection coil for supplying a current component for canceling the current component induced to the vertical deflection coil. Therefore, the cost for the deflection system as well as power consumption can be reduced.

The induced current detection circuit may generate an output voltage responsive to the current component, and the correction voltage addition circuit may include a regulating circuit regulating the amplitude and the phase of the output voltage from the induced current detection circuit and outputting the regulated output voltage as the correction voltage and an addition circuit adding the correction voltage output from the regulating circuit to the sawtooth wave voltage generated by the sawtooth wave voltage generation circuit.

In this case, the induced current detection circuit generates the output voltage responsive to the current component induced to the vertical deflection coil, while the regulating circuit regulates the amplitude and the phase of the output voltage and outputs the correction voltage having proper relation to the phase of the current component induced to the vertical deflection coil. Further, the addition circuit adds the correction voltage to the sawtooth wave voltage generated by the sawtooth wave voltage generation circuit. Thus, the first current supply circuit supplies a current component of opposite polarity to the current component induced to the vertical deflection coil to the vertical deflection coil in response to the correction voltage. Consequently, the current component induced to the vertical deflection coil can be canceled by the current component supplied from the first current supply circuit.

The induced current detection circuit may include a horizontal deflection current detection circuit detecting the current component induced to the vertical deflection coil by the horizontal deflection current flowing in the horizontal deflection coil from the horizontal deflection current.

In this case, the horizontal deflection current detection circuit detects the current component induced to the vertical deflection coil from the horizontal deflection current. Thus, the induced current component can be more readily detected as compared with the case of extracting the induced current component from the vertical deflection current.

The horizontal deflection current detection circuit may include a first transformer having a primary winding serially connected to the horizontal deflection coil and a secondary winding connected to the correction voltage addition circuit.

In this case, the horizontal deflection current is smaller than the vertical deflection current and hence the current component induced to the vertical deflection coil can be detected with a smaller transformer as compared with the case of inserting a transformer serially to the vertical deflection coil. Thus, the cost can be further reduced.

The correction voltage addition circuit may include a regulating circuit regulating the amplitude and the phase of an output voltage from the secondary winding of the first transformer and outputting the regulated output voltage as the correction voltage and an addition circuit adding the correction voltage output from the regulating circuit to the sawtooth wave voltage generated by the sawtooth wave voltage generation circuit.

In this case, the regulating circuit regulates the amplitude and the phase of the output voltage from the secondary winding of the first transformer and outputs the regulated voltage as the correction voltage, while the addition circuit adds the correction voltage to the sawtooth wave voltage.

The second current supply circuit may include a second transformer having a primary winding and a secondary winding serially connected to the vertical deflection coil and a sawtooth wave current supply circuit supplying a sawtooth wave current synchronous with the horizontal synchronizing signal to the primary winding of the second transformer.

In this case, the primary winding of the second transformer is supplied with the sawtooth wave current synchronous with the horizontal synchronizing signal, and the secondary winding supplies the second sawtooth wave current to the vertical deflection coil.

The deflection system may further comprise a feedback circuit negatively feeding back a voltage on an end of the second winding of the second transformer to the correction voltage addition circuit, and the addition circuit may add the voltage negatively fed back by the feedback circuit to the correction voltage and the sawtooth wave voltage.

In this case, the voltage on the end of the secondary winding of the second transformer is negatively fed back to the correction voltage addition circuit, while the addition circuit adds the negatively fed-back voltage to the correction voltage and the sawtooth wave voltage.

The induced current detection circuit may include a resonance circuit resonating at a frequency substantially half a horizontal scanning frequency and a resonance current detection circuit detecting a current flowing in the resonance circuit by resonance.

The frequency of the current component induced to the vertical deflection coil by the horizontal deflection current is half the horizontal scanning frequency. Therefore, the current component induced to the vertical deflection coil by the horizontal deflection current can be directly detected by detecting the current flowing in the resonance circuit resonating at the frequency substantially half the horizontal scanning frequency.

The induced current detection circuit may include a capacitor and a first transformer having a primary winding serially connected to the capacitor and a secondary winding connected to the correction voltage addition circuit, the resonance circuit may be formed by the primary winding of the first transformer, the capacitor and the vertical deflection coil, and the resonance current detection circuit may be formed by the secondary winding of the first transformer.

In this case, the primary winding of the first transformer, the capacitor and the vertical deflection coil form the resonance circuit, and the resonance current detection circuit formed by the secondary winding of the first transformer detects the current flowing in the resonance circuit. The current flowing in the resonance circuit is smaller than the vertical deflection current, and hence the current component induced to the vertical deflection coil can be detected with a smaller transformer as compared with the case of inserting a transformer serially to the vertical deflection coil. Thus, the cost can be further reduced.

The correction voltage addition circuit may include a regulating circuit regulating the amplitude and the phase of an output voltage from the secondary winding of the first transformer and outputting the regulated output voltage as the correction voltage and an addition circuit adding the correction voltage output from the regulating circuit to the sawtooth wave voltage generated by the sawtooth wave voltage generation circuit.

In this case, the regulating circuit regulates the amplitude and the phase of the output voltage from the secondary winding of the first transformer and outputs the regulated voltage as the correction voltage, while the addition circuit adds the correction voltage to the sawtooth wave voltage.

The second current supply circuit may include a second transformer having a primary winding and a secondary winding serially connected to the vertical deflection coil and a sawtooth wave current supply circuit supplying a sawtooth wave current synchronous with the horizontal synchronizing signal to the secondary winding of the second transformer, and the resonance circuit may be formed by the primary winding of the first transformer, the capacitor, the vertical deflection coil and the secondary winding of the second transformer.

In this case, the primary winding of the first transformer, the capacitor, the vertical deflection coil and the secondary winding of the second transformer form the resonance circuit, and the resonance current detection circuit formed by the secondary winding of the first transformer detects the current flowing in the resonance circuit. The current flowing in the resonance circuit is smaller than the vertical deflection current, and hence the current component induced to the vertical deflection coil can be detected with a smaller transformer as compared the case of inserting a transformer serially to the vertical deflection coil. Thus, the cost can be further reduced.

The deflection system may further comprise a feedback circuit negatively feeding back a voltage on an end of the secondary winding of the second transformer to the correction voltage addition circuit, and the addition circuit may add the voltage negatively fed back by the feedback circuit to the correction voltage and the sawtooth wave voltage.

In this case, the voltage on the end of the secondary winding of the second transformer is negatively fed back to the correction voltage addition circuit, and the addition circuit adds the negatively fed-back voltage to the correction voltage and the sawtooth wave voltage.

The first current supply circuit may include an amplifier. In this case, a current based on the sawtooth wave voltage and the correction voltage added to each other by the addition circuit is supplied to the vertical deflection coil.

A deflection method according to another aspect of the present invention, performing reciprocating scanning by horizontally deflecting an electron beam in a reciprocating manner in response to a vertical synchronizing signal and a horizontal synchronizing signal in a deflection system comprising a vertical deflection coil and a horizontal deflection coil, comprises steps of supplying a horizontal deflection current for horizontally deflecting the electron beam in a reciprocating manner to the horizontal deflection coil, detecting a current component induced to the vertical deflection coil by a horizontal deflection current flowing in the horizontal deflection coil, generating a sawtooth wave voltage synchronous with the vertical synchronizing signal, receiving the sawtooth wave voltage and supplying a first sawtooth wave current for vertically deflecting the electron beam to the vertical deflection coil, supplying a second sawtooth wave current for parallelizing forward and backward scanning lines with each other to the vertical deflection coil and adding a correction voltage for canceling the detected current component to the generated sawtooth wave voltage.

According to this deflection method, the current component induced to the vertical deflection coil by the horizontal deflection current flowing in the horizontal deflection coil is detected. The correction voltage is added to the sawtooth wave voltage on the basis of the detected current component, and the current component responsive to the correction voltage is supplied to the vertical deflection coil.

Thus, the current component induced to the vertical deflection coil by the horizontal deflection current flowing in the horizontal deflection coil can be canceled. Therefore, reciprocating deflection can be performed without distorting the scanning lines. In this case, no transformer may be serially connected to the vertical deflection coil in order to supply a current component for canceling the current component induced to the vertical deflection coil. Therefore, the cost for the deflection system as well as power consumption can be reduced.

The step of detecting the current component may include a step of detecting the current component induced to the vertical deflection coil by the horizontal deflection current flowing in the horizontal deflection coil from the horizontal deflection current.

In this case, the current component induced to the vertical deflection coil is detected from the horizontal deflection current. Thus, the induced current component can be more readily detected as compared with the case of extracting the induced current component from the vertical deflection current.

The step of detecting the current component may include steps of generating a current resonating at a frequency substantially half a horizontal scanning frequency and detecting the resonating current.

The frequency of the current component induced to the vertical deflection coil by the horizontal deflection current is half the horizontal scanning frequency. Therefore, the current component induced to the vertical deflection coil by the horizontal deflection current can be directly detected by detecting the current resonating at a frequency substantially half the horizontal scanning frequency.

BEST MODE FOR CARRYING OUT THE INVENTION (First Embodiment)

Figure 1:
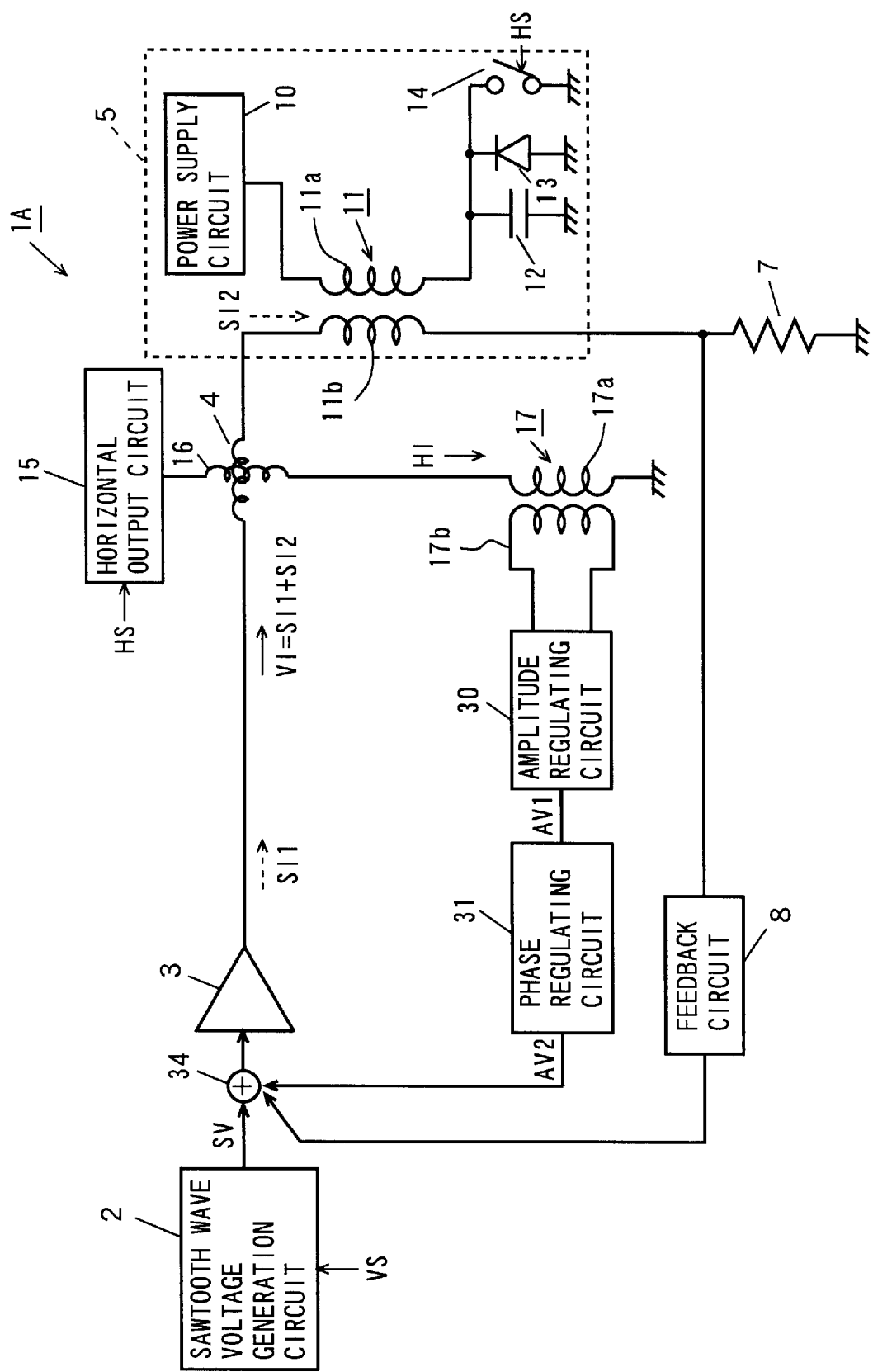
FIG. 1 is a circuit diagram showing an exemplary structure of a deflection system according to a first embodiment of the present invention.

A deflection system 1A according to a first embodiment of the present invention is now described with reference to FIG. 1. FIG. 1 is a circuit diagram showing an exemplary structure of the deflection system 1A according to the first embodiment.

The deflection system 1A shown in FIG. 1 comprises a sawtooth wave voltage generation circuit 2, an amplifier 3, a vertical deflection coil 4, a transformer 17, a resistor 7, a feedback circuit 8, a current supply circuit 5, a horizontal output circuit 15, a horizontal deflection coil 16, an amplitude regulating circuit 30, a phase regulating circuit 31 and an addition circuit 34. The current supply circuit 5 includes a power supply circuit 10, a transformer 11, a capacitor 12, a diode 13 and a switch 14.

A first input terminal of the addition circuit 34 is connected to an output terminal of the sawtooth wave voltage generation circuit 2. An input terminal of the amplifier 3 is connected to an output terminal of the addition circuit 34. The vertical deflection coil 4, a secondary winding 11*b* of the transformer 11 and the resistor 7 are serially connected between an output terminal of the amplifier 3 and a ground terminal. The node between the secondary winding 11*b* of the transformer 11 and the resistor 7 is connected to a second input terminal of the addition circuit 34 through the feedback circuit 8.

The horizontal deflection coil 16 and a primary winding 17*a* of the transformer 17 are serially connected between an output terminal of the horizontal output circuit 15 and a ground terminal. The amplitude regulating circuit 30 is connected to a secondary winding 17b of the transformer 17, and an output terminal of the amplitude regulating circuit 30 is connected to a third input terminal of the addition circuit 34 through the phase regulating circuit 31.

A first end of a primary winding 11a of the transformer 11 is connected to an output terminal of the power supply circuit 10. The capacitor 12, the diode 13 and the switch 14 are connected in parallel with each other between a second end of the primary winding 11a of the transformer 11 and a ground terminal.

Operations of the deflection system 1A shown in FIG. 1 are now described with reference to waveform diagrams of FIGS. 2(a) to 2(h).

Figure 2:
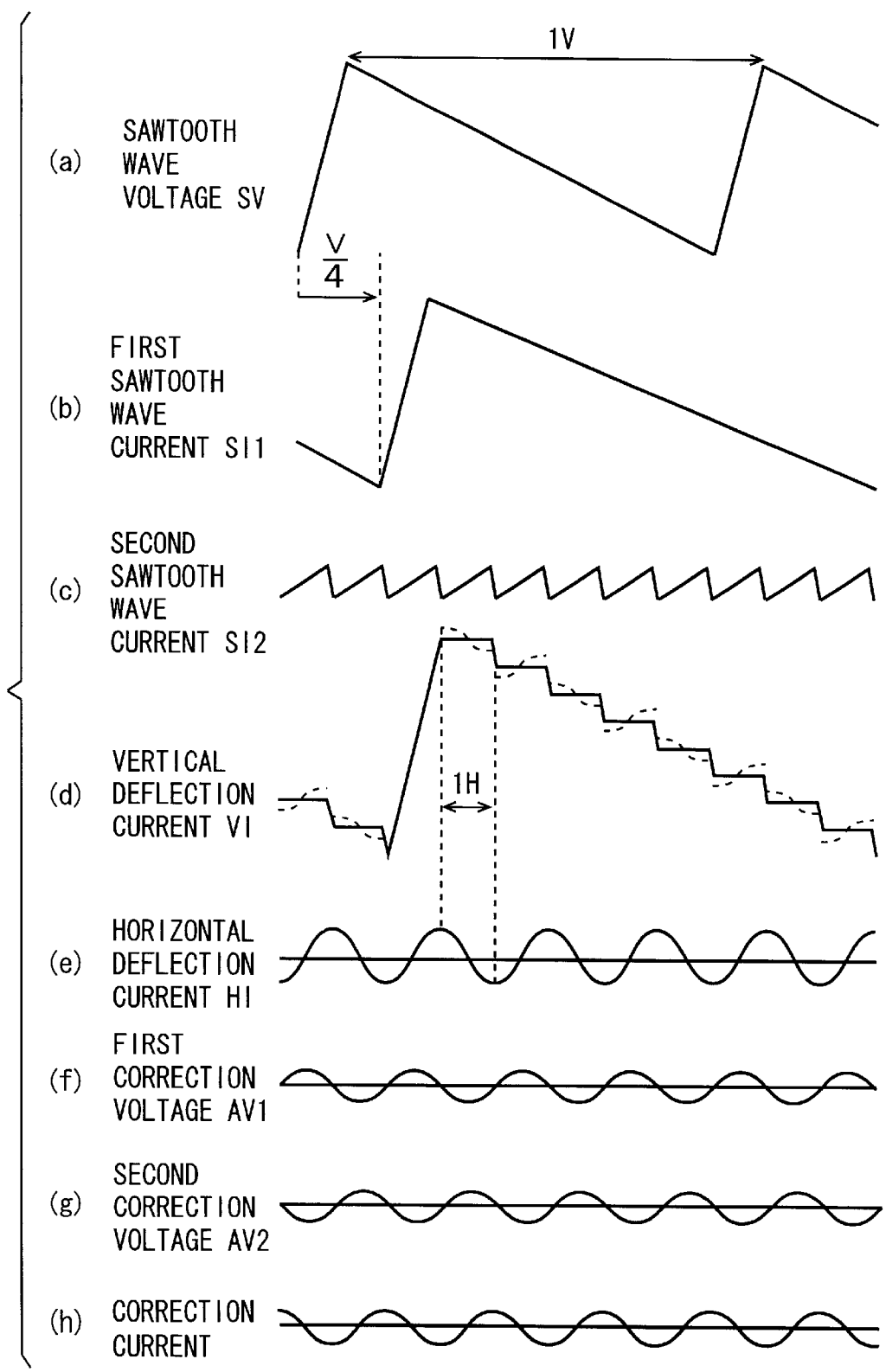
FIGS. 2(*a*) to 2(*h*) are waveform diagrams for illustrating operations of the deflection system shown in FIG. 1.

The sawtooth wave voltage generation circuit 2 generates a sawtooth wave voltage SV shown in FIG. 2(a) and outputs the same to the input terminal of the amplifier 3 through the addition circuit 34 in synchronization with a vertical synchronizing signal VS. The cycle of the sawtooth wave voltage SV corresponds to one vertical scanning period V.

The amplifier 3 supplies a first sawtooth wave current SI1 shown in FIG. 2(b) to the vertical deflection coil 4 in response to the sawtooth wave voltage SV generated by the sawtooth wave voltage generation circuit 2. The first sawtooth wave current SI1 supplied by the amplifier 3 lags the sawtooth wave voltage SV by a phase difference of about 90° (V/4), as shown in FIGS. 2(a) and 2(b) respectively.

The power supply circuit 10 of the current supply circuit 5 applies a power supply voltage to the first end of the primary winding 11a of the transformer 11. The switch 14 is turned on/off in synchronization with a horizontal synchronizing signal HS, thereby feeding a charge/discharge current to the capacitor 12 and the diode 13. Thus, the vertical deflection coil 4 is supplied with a second sawtooth wave current SI2 shown in FIG. 2(c) through the transformer 11.

The first sawtooth wave current SI1 and the second sawtooth wave current SI2 are composited with each other to obtain a vertical deflection current VI shown in FIG. 2(d). The vertical deflection coil 4 generates a vertical deflection magnetic field by the vertical deflection current VI and vertically deflects an electron beam.

Figure 5:
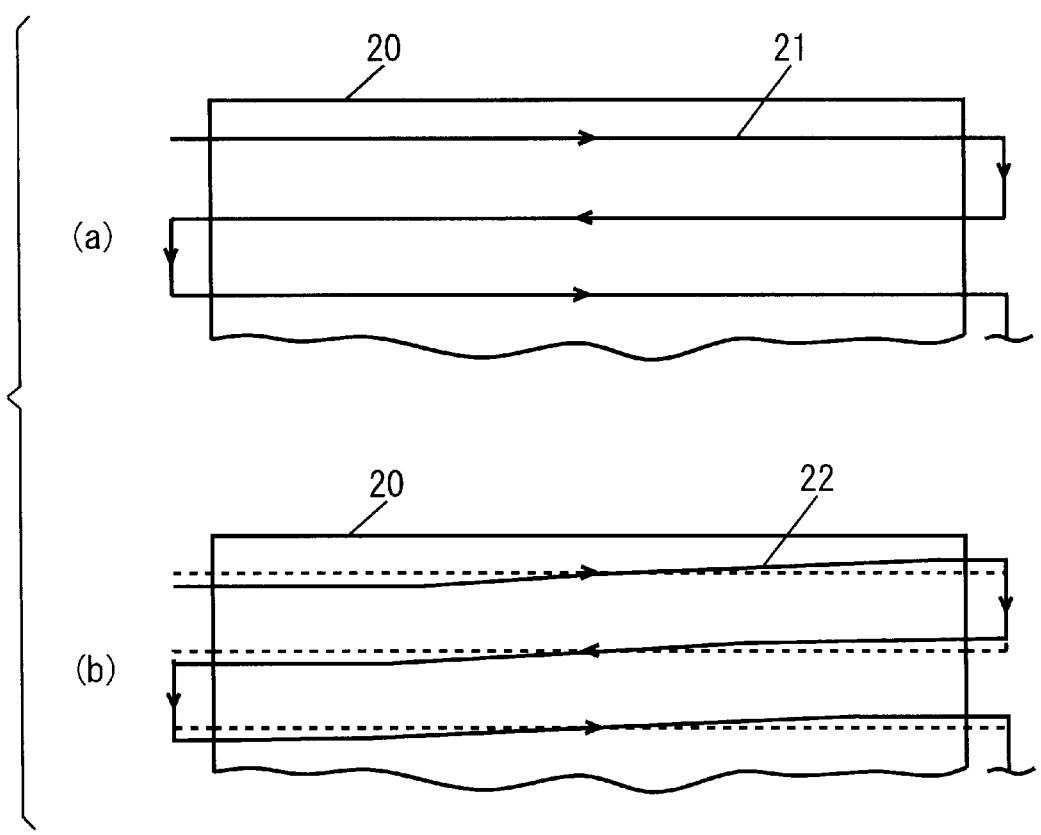
FIGS. 5(*a*) and 5(*b*) are conceptual diagrams showing scanning in the horizontal reciprocating deflection mode.

The vertical deflection current VI shown in FIG. 2(d), remarkably changing at the turn between forward scanning and backward scanning, remains constant in forward scanning and backward scanning. As shown in FIG. 5(a), therefore, the scanning line 21 is horizontal on the screen 20. Referring to FIG. 2(d), symbol H denotes one horizontal scanning period.

The feedback circuit 8 generates a negative feedback voltage on the basis of the vertical deflection current VI and supplies the negative feedback voltage to the input terminal of the amplifier 3 through the addition circuit 34, thereby correcting nonlinear distortion of the first sawtooth wave current SI1.

The horizontal output circuit 15 supplies a horizontal deflection current HI shown in FIG. 2(e) to the horizontal deflection coil 16. The frequency of the horizontal deflection current HI is half a horizontal scanning frequency due to reciprocating scanning. The horizontal deflection coil 16 generates a horizontal deflection magnetic field by the horizontal deflection current HI and horizontally deflects the electron beam in a reciprocating manner. At this time, the horizontal deflection current HI flowing in the horizontal deflection coil 16 induces a current component to the vertical deflection coil 4. Consequently, the vertical deflection current VI is distorted as shown by broken lines in FIG. 2(d).

A voltage responsive to the horizontal deflection current HI flowing in the primary winding 17a of the transformer 17 is generated on the secondary winding 17b of the transformer 17. The amplitude regulating circuit 30 regulates the amplitude of the voltage developed across the secondary winding 17b of the transformer 17, and outputs the regulated voltage to the phase regulating circuit 31 as a first correction voltage AV1 shown in FIG. 2(f). The first correction voltage AV1 leads the horizontal deflection current HI by a phase difference of 90°.

The phase regulating circuit 31 regulates the phase of the first correction voltage AV1 output from the amplitude regulating circuit 30 and outputs the regulated voltage as a second correction voltage AV2 shown in FIG. 2(g). For example, the amplitude regulating circuit 30 shifts the phase of the first correction voltage AV1 by 180° and supplies the phase-shifted voltage to the addition circuit 34 as the second correction voltage AV2.

Finally, the addition circuit 34 supplies a voltage obtained by adding the sawtooth wave voltage SV generated by the sawtooth wave voltage generation circuit 2, the negative feedback voltage generated by the feedback circuit 8 and the second correction voltage AV2 output from the phase regulating circuit 31 to each other to the input terminal of the amplifier 3. Thus, a correction current shown in FIG. 2(h) responsive to the second sawtooth wave voltage AV2 is added to the first sawtooth wave current SI1 output from the amplifier 3. The correction current supplied by the amplifier 3 lags the second correction voltage AV2 by a phase difference of 90°, as shown in FIG. 2(h). The correction current is regulated by the amplitude regulating circuit 30 and the phase regulating circuit 31 to be of opposite polarity to and of the same magnitude as the current component induced to the vertical deflection coil 4 by the horizontal deflection current HI of the horizontal deflection coil 16. Therefore, the current induced to the vertical deflection coil 4 by the horizontal deflection current HI is canceled by the correction circuit. Consequently, the distortion of the vertical deflection current VI shown by the broken lines in FIG. 2(d) is corrected to that shown by solid lines.

In the deflection system 1A according to this embodiment, as hereinabove described, the correction current supplied by the amplifier 3 in correspondence to the second correction voltage AV2 output from the phase regulating circuit 31 can cancel the current component induced to the vertical deflection coil 4 by the horizontal deflection current HI of the horizontal deflection coil 16 in response to the horizontal deflection current HI detected by the transformer 17.

In this case, the correction voltage AV2 is added to the vertical deflection voltage SV in front of the amplifier 3, to require neither a large-capacity transformer nor a driving circuit for adding the correction current to the vertical deflection current VI. Consequently, the cost as well as power consumption can be reduced.

In the embodiment, the horizontal output circuit 15 corresponds to the horizontal deflection current supply circuit, the transformer 17 corresponds to the induced current detection circuit as well as the horizontal deflection current detection circuit, the amplitude regulating circuit 30 and the phase regulating circuit 31 correspond to the regulating circuit, the amplitude regulating circuit 30, the phase regulating circuit 31 and the addition circuit 34 correspond to the correction voltage addition circuit, the amplifier 3 corresponds to the first current supply circuit, and the current supply circuit 5 corresponds to the second current supply circuit.

(Second Embodiment)

Figure 3:
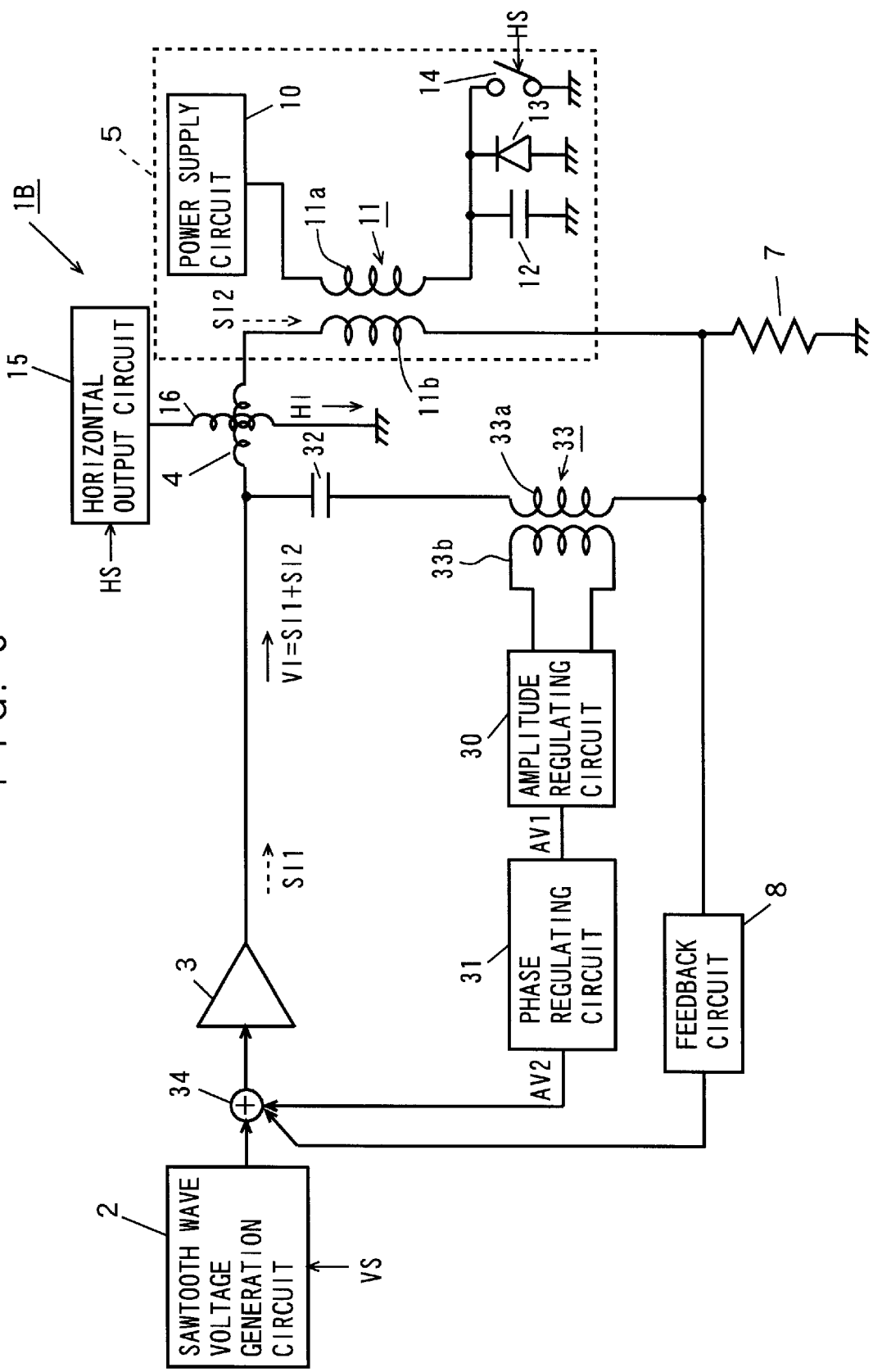
FIG. 3 is a circuit diagram showing an exemplary structure of a deflection system according to a second embodiment of the present invention.
Figure 4:
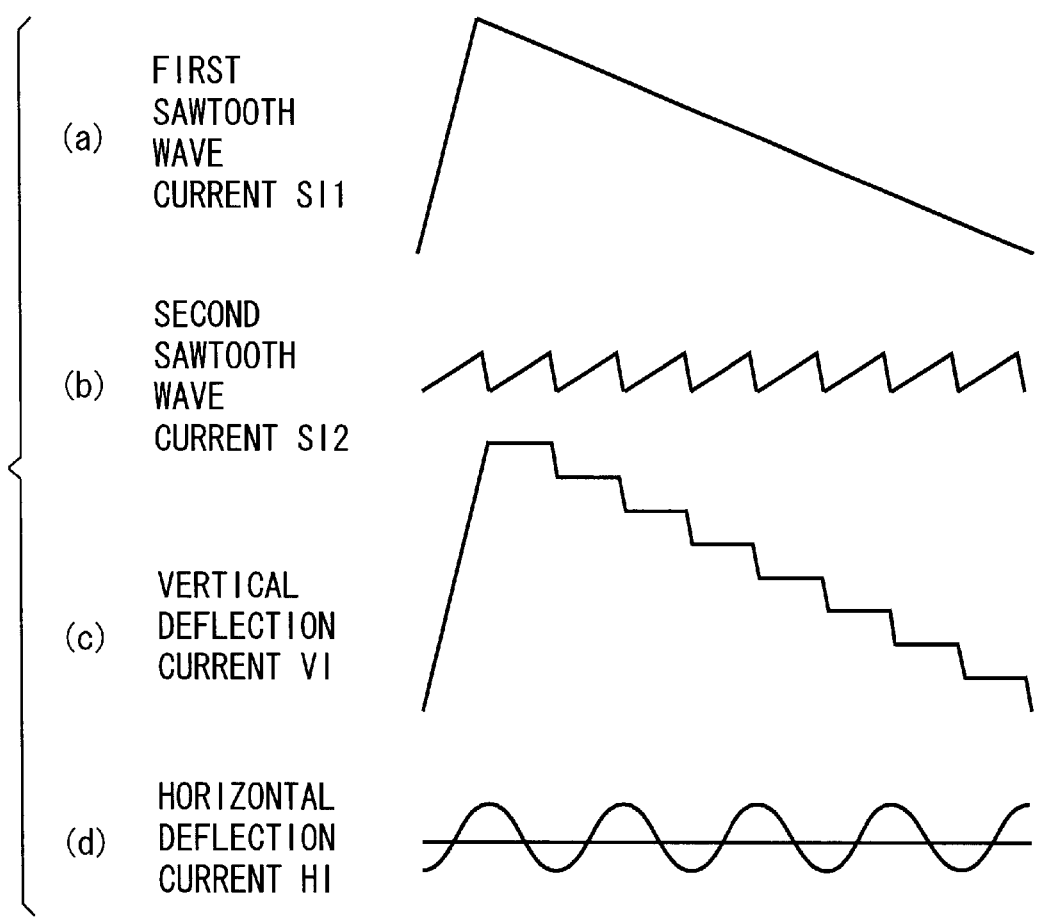
FIGS. 4(*a*) to 4(*d*) are waveform diagrams for illustrating operations in a horizontal reciprocating deflection mode.

A deflection system 1B according to a second embodiment of the present invention is now described with reference to FIG. 3. FIG. 3 is a circuit diagram showing an exemplary structure of the deflection system 1B according to the second embodiment.

The deflection system 1B shown in FIG. 3 comprises a sawtooth wave voltage generation circuit 2, an amplifier 3, a vertical deflection coil 4, a current supply circuit 5, a resistor 7, a feedback circuit 8, a horizontal output circuit 15, a horizontal deflection coil 16, an amplitude regulating circuit 30, a phase regulating circuit 31, a capacitor 32, a transformer 33 and an addition circuit 34.

The deflection system 1B according to the second embodiment is different from the deflection system 1A according to the first embodiment in a point that, while the transformer 1A detects the current component induced to the vertical deflection coil 4 by the horizontal deflection current HI of the horizontal deflection coil 16 from the horizontal deflection current HI with the transformer 17, the deflection system 1B extracts and detects the current component from a vertical deflection current VI.

Therefore, the deflection system 1B comprises the capacitor 32 and the transformer 33 in place of the transformer 17. In other words, the deflection system 1B is different from the deflection system 1A only in a detection circuit for detecting the current component induced to the vertical deflection coil 4 by a horizontal deflection current HI of the horizontal deflection coil 16, and the remaining structure thereof is identical to that of the deflection system 1A. Referring to FIG. 3, parts identical or corresponding to those in FIG. 1 are denoted by the same reference numerals.

The detection circuit for detecting the current component induced to the vertical deflection coil 4 by the horizontal deflection current HI is now described. The capacitor 32 and a primary winding 33a of the transformer 33 are serially connected with each other, so that the capacitor 32 and the transformer 33 form a first serially connected body. The vertical deflection coil 4 and a secondary winding 11b of a transformer 11 are serially connected with each other, so that the vertical deflection coil 4 and the transformer 11 form a second serially connected body. The first and second serially connected bodies are connected in parallel with each other to form a resonance circuit.

The first and second serially connected bodies form the resonance circuit, and hence a resonance current flows in a loop formed by the vertical deflection coil 4, the transformers 11 and 33 and the capacitor 32. The resonance current flowing in this loop is so regulated as to have a frequency half a horizontal scanning frequency. Thus, the resonance current has the same frequency as the current component induced to the vertical deflection coil 4 by the horizontal deflection current HI of the horizontal deflection coil 16. Therefore, a voltage responsive to the current component induced to the vertical deflection coil 4 by the horizontal deflection current HI of the horizontal deflection coil 16 is generated on a secondary winding 33b of the transformer 33.

The amplitude regulating circuit 30 regulates the amplitude of the voltage developed across the secondary winding 33b of the transformer 33 and outputs the first correction voltage AV1 shown in FIG. 2(f), while the phase regulating circuit 31 regulates the phase of the first correction voltage AV1 output from the amplitude regulating circuit 30 and outputs the second correction voltage AV2 shown in FIG. 2(g). Thus, the current component induced to the vertical coil 4 by the horizontal deflection current HI of the horizontal deflection coil 16 is canceled similarly to the deflection system 1A according to the first embodiment.

In this case, the resonance current flowing in the transformer 33 is smaller than the vertical deflection current VI, and hence the transformer 33 can be prepared from that of a small capacity. Also in this embodiment, therefore, the cost and power consumption can be reduced.

In the deflection system 1B according to this embodiment, the correction current supplied by the amplifier 3 in correspondence to the second correction voltage AV2 output from the phase regulating circuit 31 can cancel the current component induced to the vertical deflection coil 4 by the horizontal deflection current HI of the horizontal deflection coil 16 in response to the current component detected by the capacitor 32 and the transformer 33.

In the second embodiment, the capacitor 32 and the transformer 33 correspond to the induced current detection circuit, and the transformer 33 corresponds to the resonance current detection circuit.

What is claimed is:

1. A deflection system performing reciprocating scanning by horizontally deflecting an electron beam in a reciprocating manner in response to a vertical synchronizing signal and a horizontal synchronizing signal, comprising:

a vertical deflection coil;

a horizontal deflection coil;

a horizontal deflection current supply circuit supplying a horizontal deflection current for horizontally deflecting said electron beam in a reciprocating manner;

an induced current detection circuit detecting a current component induced to said vertical deflection coil by said horizontal deflection current flowing in said horizontal deflection coil;

a sawtooth wave voltage generation circuit generating a sawtooth wave voltage synchronous with said vertical synchronizing signal;

a first current supply circuit receiving said sawtooth wave voltage generated by said sawtooth wave voltage generation circuit and supplying a first sawtooth wave current for vertically deflecting said electron beam to said vertical deflection coil;

a second current supply circuit supplying a second sawtooth wave current for parallelizing forward and backward scanning lines with each other to said vertical deflection coil; and a correction voltage addition circuit adding a correction voltage for canceling said current component detected by said induced current detection circuit to said sawtooth wave voltage generated by said sawtooth wave voltage generation circuit.

2. The deflection system according to claim 1, wherein said induced current detection circuit generates an output voltage responsive to said current component, and said correction voltage addition circuit includes:

a regulating circuit regulating the amplitude and the phase of said output voltage from said induced current detection circuit and outputting the regulated output voltage as said correction voltage, and an addition circuit adding said correction voltage output from said regulating circuit to said sawtooth wave voltage generated by said sawtooth wave voltage generation circuit.

3. The deflection system according to claim 1, wherein said induced current detection circuit includes a horizontal deflection current detection circuit detecting said current component induced to said vertical deflection coil by said horizontal deflection current flowing in said horizontal deflection coil from said horizontal deflection current.

4. The deflection system according to claim 3, wherein said horizontal deflection current detection circuit includes a first transformer having a primary winding serially connected to said horizontal deflection coil and a secondary winding connected to said correction voltage addition circuit.

5. The deflection system according to claim 4, wherein said correction voltage addition circuit includes:
a regulating circuit regulating the amplitude and the phase of an output voltage from said secondary winding of said first transformer and outputting the regulated output voltage as said correction voltage, and
an addition circuit adding said correction voltage output from said regulating circuit to said sawtooth wave voltage generated by said sawtooth wave voltage generation circuit.

6. The deflection system according to claim 5, wherein said second current supply circuit includes:
a second transformer having a primary winding and a secondary winding serially connected to said vertical deflection coil, and
a sawtooth wave current supply circuit supplying a sawtooth wave current synchronous with said horizontal synchronizing signal to said primary winding of said second transformer.

7. The deflection system according to claim 6, further comprising a feedback circuit negatively feeding back a voltage on an end of said second winding of said second transformer to said correction voltage addition circuit, wherein
said addition circuit adds said voltage negatively fed back by said feedback circuit to said correction voltage and said sawtooth wave voltage.

8. The deflection system according to claim 1, wherein said induced current detection circuit includes:
a resonance circuit resonating at a frequency substantially half a horizontal scanning frequency, and
a resonance current detection circuit detecting a current flowing in said resonance circuit by resonance.

9. The deflection system according to claim 8, wherein said induced current detection circuit includes a capacitor and a first transformer having a primary winding serially connected to said capacitor and a secondary winding connected to said correction voltage addition circuit,
said resonance circuit is formed by said primary winding of said first transformer, said capacitor and said vertical deflection coil, and
said resonance current detection circuit is formed by said secondary winding of said first transformer.

10. The deflection system according to claim 9, wherein said correction voltage addition circuit includes:
a regulating circuit regulating the amplitude and the phase of an output voltage from said secondary winding of said first transformer and outputting the regulated output voltage as said correction voltage, and
an addition circuit adding said correction voltage output from said regulating circuit to said sawtooth wave voltage generated by said sawtooth wave voltage generation circuit.

11. The deflection system according to claim 10, wherein said second current supply circuit includes:
a second transformer having a primary winding and a secondary winding serially connected to said vertical deflection coil, and
a sawtooth wave current supply circuit supplying a sawtooth wave current synchronous with said horizontal synchronizing signal to said secondary winding of said second transformer, and
said resonance circuit is formed by said primary winding of said first transformer, said capacitor, said vertical deflection coil and said secondary winding of said second transformer.

12. The deflection system according to claim 11, further comprising a feedback circuit negatively feeding back a voltage on an end of said secondary winding of said second transformer to said correction voltage addition circuit, wherein
said addition circuit adds said voltage negatively fed back by said feedback circuit to said correction voltage and said sawtooth wave voltage.

13. The deflection system according to claim 1, wherein said first current supply circuit includes an amplifier.

14. A deflection method of performing reciprocating scanning by horizontally deflecting an electron beam in a reciprocating manner in response to a vertical synchronizing signal and a horizontal synchronizing signal in a deflection system comprising a vertical deflection coil and a horizontal deflection coil, said method comprising steps of:
supplying a horizontal deflection current for horizontally deflecting said electron beam in a reciprocating manner to said horizontal deflection coil;
detecting a current component induced to said vertical deflection coil by a horizontal deflection current flowing in said horizontal deflection coil;
generating a sawtooth wave voltage synchronous with said vertical synchronizing signal;
receiving said sawtooth wave voltage and supplying a first sawtooth wave current for vertically deflecting said electron beam to said vertical deflection coil;
supplying a second sawtooth wave current for parallelizing forward and backward scanning lines with each other to said vertical deflection coil; and
adding a correction voltage for canceling said detected current component to said generated sawtooth wave voltage.

15. The deflection method according to claim 14, wherein said step of detecting said current component includes a step of detecting said current component induced to said vertical deflection coil by said horizontal deflection current flowing in said horizontal deflection coil from said horizontal deflection current.

16. The deflection method according to claim 14, wherein said step of detecting said current component includes steps of generating a current resonating at a frequency substantially half a horizontal scanning frequency and detecting said resonating current.

* * * * *